(12) United States Patent
Aggarwal et al.

(10) Patent No.: US 11,997,419 B2
(45) Date of Patent: *May 28, 2024

(54) DEVICE IDENTIFICATION AND POWER STATE DETERMINATION USING MEDIA DEVICE INFORMATION

(71) Applicant: Caavo Inc, Milpitas, CA (US)

(72) Inventors: Ashish D. Aggarwal, Stevenson Ranch, CA (US); Sharath H. Satheesh, Bangalore (IN); Conrad Savio Jude Gomes, Salcete (IN)

(73) Assignee: Caavo Inc, Milpitas, CA (US)

(*) Notice: Subject to any disclaimer, the term of this patent is extended or adjusted under 35 U.S.C. 154(b) by 86 days.

This patent is subject to a terminal disclaimer.

(21) Appl. No.: 17/736,401

(22) Filed: May 4, 2022

(65) Prior Publication Data

US 2022/0264054 A1 Aug. 18, 2022

Related U.S. Application Data

(63) Continuation of application No. 16/250,808, filed on Jan. 17, 2019, now Pat. No. 11,356,636.

(30) Foreign Application Priority Data

Jan. 19, 2018 (IN) .............................. 201841002345

(51) Int. Cl.
*H04N 7/025* (2006.01)
*G09G 5/00* (2006.01)
(Continued)

(52) U.S. Cl.
CPC ............... *H04N 7/025* (2013.01); *G09G 5/00* (2013.01); *H04N 5/44* (2013.01); *H04N 5/63* (2013.01); *H04N 7/10* (2013.01); *H04N 7/104* (2013.01); *H04N 21/43635* (2013.01); *H04N 21/4367* (2013.01); *H04N 21/44227* (2013.01); *H04N 21/44231* (2013.01)

(58) Field of Classification Search
None
See application file for complete search history.

(56) References Cited

U.S. PATENT DOCUMENTS 8,127,059 B1 2/2012 Carr et al.
9,021,151 B2 4/2015 Yagi
(Continued)

*Primary Examiner* — Henry Tsai
*Assistant Examiner* — Christopher A Bartels
(74) *Attorney, Agent, or Firm* — Sterne, Kessler, Goldstein & Fox P.L.L.C.

(57) ABSTRACT

Methods, systems, and apparatuses are described for determining a power state of a device. Identification data may be received, e.g., in a media device hub, from one or more devices coupled to the device hub. In some example implementations, the devices coupled to the device hub may comprise an intermediate device coupled to the hub via a first multimedia cable and a sink media device coupled to the intermediate device via a second multimedia cable. Attributes may be identified in the received identification data, such as attributes relating to one or more of the coupled devices. The attributes may be associated with one or more of the devices that are coupled to the device hub. Based on an association of attributes, a power state of one or more of the devices coupled to the hub may be determined.

20 Claims, 6 Drawing Sheets

(51) Int. Cl.
*H04N 5/44* (2011.01)
*H04N 5/63* (2006.01)
*H04N 7/10* (2006.01)
*H04N 21/4363* (2011.01)
*H04N 21/4367* (2011.01)
*H04N 21/442* (2011.01)

(56) References Cited

U.S. PATENT DOCUMENTS

| | | |
|---|---|---|
| 9,232,265 B2 | 1/2016 | Maxwell et al. |
| 9,286,261 B1 | 3/2016 | Tzelnic et al. |
| 9,693,109 B1 | 6/2017 | Mishra et al. |
| 10,321,111 B2 * | 6/2019 | Uchimura ............... H04N 11/24 |
| 10,565,153 B2 | 2/2020 | Kashyap et al. |
| 10,904,477 B2 | 1/2021 | Aggarwal et al. |
| 11,356,636 B2 * | 6/2022 | Aggarwal ........ H04N 21/43635 |
| 11,556,489 B2 * | 1/2023 | Pan ..................... G06F 13/4081 |
| 2002/0133646 A1 | 9/2002 | Cheung et al. |
| 2004/0148460 A1 | 7/2004 | Steinmetz et al. |
| 2008/0088495 A1 | 4/2008 | Kawakita |
| 2008/0133779 A1 | 6/2008 | Ho et al. |
| 2009/0103362 A1 | 4/2009 | Pekny et al. |
| 2009/0137318 A1 | 5/2009 | Russo et al. |
| 2010/0185808 A1 | 7/2010 | Yu et al. |
| 2011/0012990 A1 | 1/2011 | Broberg |
| 2011/0016267 A1 | 1/2011 | Lee et al. |
| 2011/0153910 A1 | 6/2011 | MacKenna et al. |
| 2012/0233361 A1 * | 9/2012 | Dalal .................... G06F 1/3278 710/32 |
| 2012/0324147 A1 | 12/2012 | Lai |
| 2013/0117491 A1 * | 5/2013 | Hwang ............... G06F 13/4068 710/316 |
| 2013/0172049 A1 * | 7/2013 | Duong .................. G09G 5/006 455/559 |
| 2013/0325998 A1 * | 12/2013 | Hormuth ................ H04L 41/06 709/212 |
| 2014/0040550 A1 * | 2/2014 | Nale .................... G06F 13/1694 711/118 |
| 2014/0149607 A1 * | 5/2014 | Shim ...................... G06F 13/24 710/48 |
| 2014/0281057 A1 | 9/2014 | Cohen et al. |
| 2016/0142647 A1 | 5/2016 | Gopinath et al. |
| 2016/0179710 A1 | 6/2016 | Das Sharma et al. |
| 2016/0182154 A1 | 6/2016 | Fang et al. |
| 2017/0039162 A1 | 2/2017 | Mishra et al. |
| 2018/0098045 A1 * | 4/2018 | Uchimura ............ G11B 27/329 |
| 2019/0065426 A1 | 2/2019 | Das Sharma et al. |
| 2019/0149265 A1 | 5/2019 | Das Sharma |
| 2019/0230318 A1 | 7/2019 | Aggarwal et al. |
| 2019/0230406 A1 | 7/2019 | Aggarwal et al. |
| 2019/0243637 A1 | 8/2019 | Nachimuthu et al. |
| 2019/0310913 A1 | 10/2019 | Helmick et al. |
| 2019/0342199 A1 | 11/2019 | Hurson et al. |
| 2020/0057508 A1 | 2/2020 | Menachem et al. |
| 2020/0061811 A1 | 2/2020 | Iqbal et al. |
| 2020/0082241 A1 | 3/2020 | Paillet et al. |
| 2020/0090383 A1 | 3/2020 | Dwivedi |
| 2022/0035458 A1 * | 2/2022 | Menachem ........... G06F 3/1438 |

* cited by examiner

DEVICE IDENTIFICATION AND POWER STATE DETERMINATION USING MEDIA DEVICE INFORMATION

CROSS-REFERENCE TO RELATED APPLICATIONS

This application is a continuation of U.S. patent application Ser. No. 16/250,808, filed on Jan. 17, 2019, which claims foreign priority to Indian Patent Application No. 201841002345, filed on Jan. 19, 2018, the entireties of which are incorporated by reference herein.

BACKGROUND

Technical Field

The subject matter described herein relates to the automatic identification of a media device and its power state.

Description of Related Art

An entertainment system may comprise several audio/video (AV) devices connected to a television (TV), such as a high definition TV (HDTV). These devices may include, for example, a cable/satellite TV set top box (STB), an audio system, a Blu-Ray® or DVD (digital versatile disc) player, a digital media adapter, a game console, a multimedia streaming device, etc. Most of these devices now come with a high-speed high-definition media interface (HDMI) to allow transfer of high resolution video and audio from a source device (e.g., Blu-Ray® player, cable TV set top box, etc.) to a sink device (typically a television).

However, upon connecting a source device to a sink device, a user typically needs to manually indicate (e.g., through a user interface) a brand, make, or model of the media device. For instance, if a user wishes to program a universal remote control to control the connected source device, an on-screen prompt may be displayed on the remote control or television with which a user can interact to identify the connected device to obtain programming instructions. With the increase in the number of connected source devices, the manual identification can be cumbersome, complex, and time-consuming. In addition, even where a universal remote control or the like is programmed manually, such remotes are typically limited to transmitting fixed signals based on the push of a particular button. Such button pushes can result to unnecessary signals being transmitted, such as a signal to power on a device that is already powered on, leading to an unintended result of powering off the device.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for determining a power state of a device. Identification data may be received, e.g., in a media device hub, from one or more devices coupled to the device hub. In some example implementations, the devices coupled to the device hub may comprise an intermediate device coupled to the hub via a first multimedia cable and a sink media device coupled to the intermediate device via a second multimedia cable. Attributes may be identified in the received identification data, such as attributes relating to one or more of the coupled devices. The attributes may be associated (correlated) with one or more of the devices that are coupled to the device hub. Based on an association of attributes, a power state of one or more of the devices coupled to the hub may be determined. In this manner, the power states of various devices may be determined by the device hub automatically using the received identification data.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
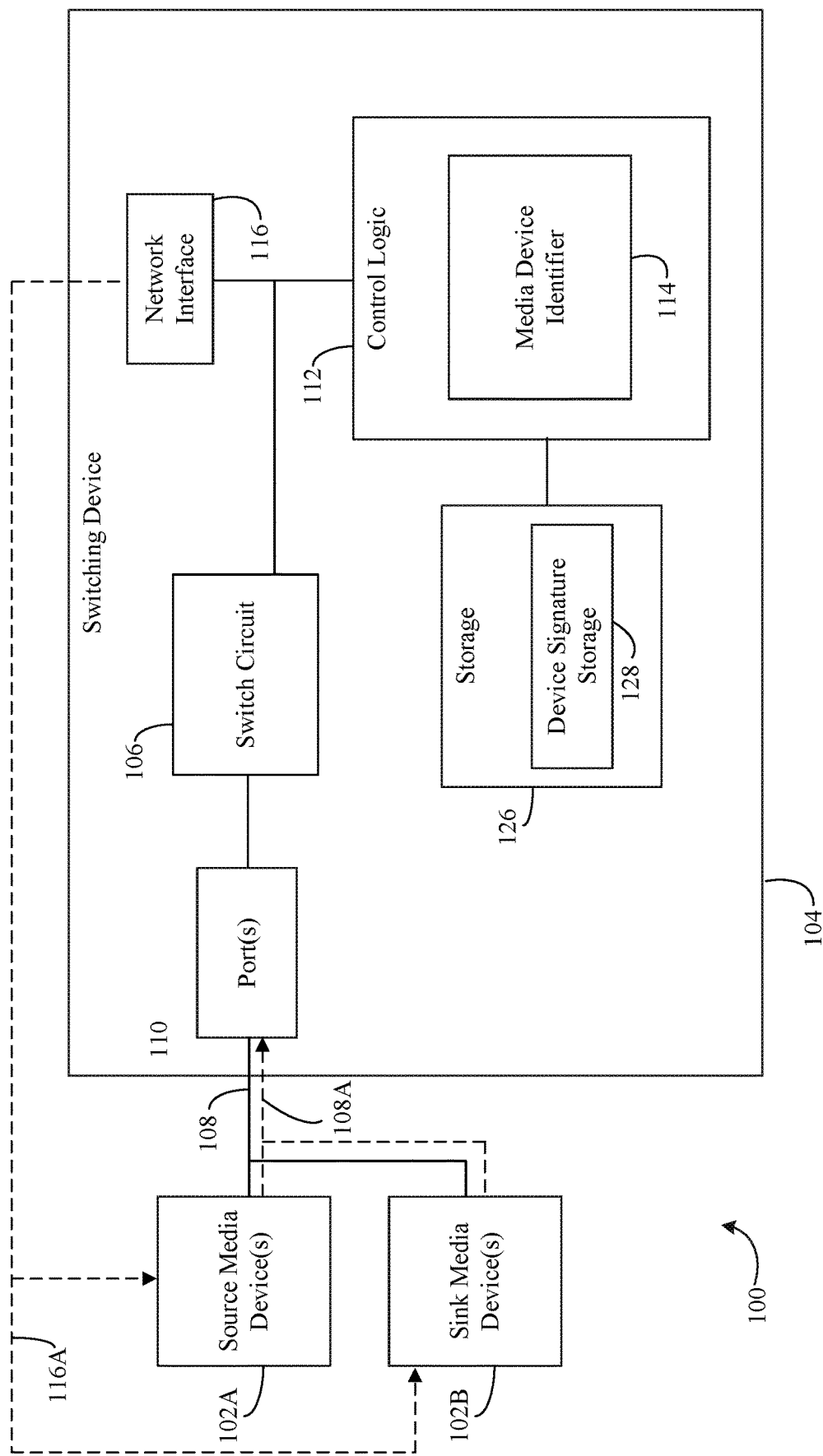
FIG. 1 is a block diagram of an example media system that includes a multimedia switching device in accordance with embodiments described herein.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

II. Example Embodiments

An entertainment system may comprise several AV devices connected to a TV or HDTV. These devices may include, for example, a cable/satellite TV STB, an audio system, a Blu-Ray® or DVD player, a digital media adapter, a game console, a multimedia streaming device, etc. Most of these devices now come with a high-speed HDMI interface to allow transfer of high resolution video and audio from the source device (e.g., Blu-ray® player, cable TV set top box, etc.) to a sink device (a display device, which is typically a television).

However, upon connecting the source device to the sink device, a user typically needs to manually indicate (e.g., through a user interface) a brand, make, or model of the media device. For instance, if a user wishes to program a universal remote control to control the connected source device, an on-screen prompt may be displayed in which a user can identify the connected device to obtain programming instructions. With the increase in the number of connected source devices, the manual identification can be cumbersome and time-consuming. In addition, even where a universal remote or the like is programmed manually, such remotes are typically limited to transmitting fixed signals based on the push of a particular button. However, this can result in unnecessary signals being transmitted, such as a signal to power on a device that is already powered on, leading to an unintended result of powering off the device.

Techniques are described herein to enable the automatic identification of a media device using information obtained from the media device. For instance, techniques are described that enable an automatic identification of a media device acting as a sink device (e.g., a display device such as a television, a monitor, or a projector, a repeater, audio video receiver (AVR), or a switching device acting as a sink device, etc.) using identification data received over a connection interface. In accordance with embodiments, upon connecting a sink media device to another electronic device acting as a source media device (e.g., a media player, a gaming console, a switching device, AVR, or repeater acting as a source device, etc.), the sink media device may transmit identification data over the connection interface (e.g., a multimedia cable such as a HDMI cable) to the source media device. In response to receiving the identification data, the source media device may parse the received data and determine whether the data (or a signature generated or associated with the data) corresponds to a brand, make, or model of a device in a data structure (e.g., a database) stored locally on the source media device or stored remotely.

For example, a sink media device connected to a switching device via a multimedia cable may transmit a collection of display identification data. Identification data refers to any type of data and/or data structure, transmitted by a media device to another device, comprising information relating to the media device's audio and/or video capabilities. For instance, identification data may include information such as display properties or capabilities of the sink media device, signaling parameters, supported resolutions, High Dynamic Range (HDR) support, audio capability information (e.g., number of audio channels), etc. as provided by a manufacturer of the media device. In embodiments, the identification data may be in any form, including but not limited to Extended Display Identification Data (EDID) information transmitted over an interface, such as an HDMI interface. Using the identification data, the source media device (e.g., a repeater, an AVR, or a switching device acting as a source media device) may parse the data to identify one or more attributes. Because a given device's identification data contains a wide variety of attributes that may be unique to the media device, it is unlikely that two different brands, makes, or models of media devices will contain the same attributes in the received identification data. The source media device may then reference a data structure (e.g., a database) to determine whether the generated device signature corresponds to a device brand, make, or model in the data structure to identify the device. In this manner, a sink media device brand, make, or model coupled to another device (such as a source device or a media device hub) may be automatically identified with reduced user input.

Furthermore, techniques described herein may be further used to determine a power state of one or more coupled devices. For example, a source media device (e.g., a streaming multimedia device) may be coupled to a sink media device (e.g., a display device or a media device hub) in a number of ways, including via an intermediate device (e.g., an AVR, an AV repeater, etc., or other intermediate media device). In this example, the source media device may determine a power state of either the sink media device and/or the intermediate device based on the received identification data. For instance, where the intermediate device is powered off and the sink media device is powered on, the source media device may parse the received identification data to identify attributes associated with the sink media device. In a scenario where the intermediate device is powered on and the sink media device is powered off, the source media device may parse the identification data to identify attributes associated with the intermediate device. Where both the intermediate device and the sink media device are powered on, the source media device may identify attributes associated with both the intermediate device and the sink device. In this manner, a source media device can easily determine the power states of one or more coupled devices based on the received identification data.

In other examples, the source device may use the identification data to generate a signature that may be used to identify a device brand, make, and/or model of a coupled device. Since a given device's identification data may be unique to the media device, it is unlikely that two devices will contain the same device signature. As a result, the generated signature may be compared against a plurality of signatures stored in a data structure (e.g., a local or remote database) to identify the device brand, make, or model.

In some further example embodiments, the source device (e.g., a media device hub or the like, in examples) may be configured to store such a signature and/or the received identification data in a storage device. For example, the source device may store one or more device attributes associated with each of the devices coupled to the hub in a device map that maps coupled devices, identification information, and a coupled port. In this manner, techniques may enable the source device to determine if a sink media device was previously connected to a source media device. For example, the data structure or other storage device may comprise a flag or other indicator (e.g., a port number) indicating that a sink media device has been previously coupled to the source device or media device hub. In this manner, if a device is disconnected and reconnected, the automatic identification may be performed by determining if the received identification data correlates to identification data (including but not limited to a signature generated therefrom) stored in a data structure such as a device map.

FIG. 1 is a block diagram of a media system 100 that is configured to automatically identify a media device based on information obtained from the media device, in accordance with an embodiment. As shown in FIG. 1, system 100 includes one or more source media device(s) 102A, one or more sink media devices 102B, and a switching device 104. Switching device 104 includes any type of media device hub, such as a multimedia switching device, an AVR, a repeater, or any other device that may comprise a media device hub or may operate as a hub for media devices. For instance, a media device hub as used herein may include a plurality of input and/or output AV ports and be operable to select an appropriate input and/or output port based on a selection (e.g., a user selection). An example of switching device 104 that may implement, or be adapted to implement, techniques described herein include, but is not limited to Control Center®, available from Caavo Inc. In some other examples, a media device hub may also include one or more sink or source devices that comprise a plurality of AV ports such that the device can switch an input and/or output port based on a selection.

In the illustrative example shown in FIG. 1, source media device(s) 102A may be source devices configured to provide audio and/or video signals. For instance, source media device(s) 102A may include one or more of a multimedia device, such as a Blu-ray® player, a STB, a streaming media player (e.g., a Roku® streaming media device, etc.), or any other device that is configured to provide audio and/or video content for playback on another device. Sink media device(s) 102B may include sink devices configured to receive audio and/or video signals, such as a display device. As used herein, a sink device may also comprise one or more other devices, such as a media device hub that may act as an intermediate device by receiving audio and/or video content from a source device and provide such content to another device (e.g., a TV) for playback. In another example, certain source devices (e.g., STBs, gaming consoles, etc.) may also act as AV repeaters such that those devices may receive AV content from source device and transmit it to sink device for playback (e.g., by passing through the AV content). The types of media devices are only illustrative, and source and sink media device(s) 102A and 102B may be any electronic device capable of providing and/or playing back AV signals.

As shown in FIG. 1, switching device 104 includes one or more AV ports 110, a switch circuit 106, control logic 112, a network interface 116, and a storage 126. Control logic 112 includes a media device identifier 114 as will be described in greater detail below. As further shown in FIG. 1, source media devices 102A and/or sink media device(s) 102B is/are coupled to AV port(s) 110. In embodiments, source media devices 102A and/or sink media device(s) 102B may be coupled to AV port(s) 110 via a multimedia cable such as an HDMI cable 108. It is noted, however, that implementations are not limited to coupling devices as shown in FIG. 1 using an HDMI cable, but may comprise other types of multimedia cables, including standard definition cables, coaxial cables, USB (Universal Serial Bus) cables, Digital Video Interface (DVI) cables, DisplayPort interface cables, and wireless AV interfaces. Port(s) 110 may be further configured to receive identification data 108A via the cable 108. In some embodiments, the identification data 108A comprises EDID of the one or more sink media device(s) 102B.

AV port(s) 110 may be automatically configured to be source AV ports or sink AV ports upon connecting electronic device(s) to AV port(s) 110. In accordance with embodiments, switching device 104 may act as either a source media device or a sink media device. For instance, when switching device 104 is configured to receive AV signals from one of source media device(s) 102A (e.g., via HDMI cable 108), switching device 104 may act as an HDMI sink device. Furthermore, when switching device 104 is configured to transmit AV signals to one of sink media device(s) 102B (e.g., via HDMI cable 108), switching device 104 may act as an HDMI source device in accordance with embodiments.

Switch circuit 106 may be configured to connect a particular source AV port (e.g., one of AV port(s) 110) to a particular one or more sink AV ports (e.g., another one of AV port(s) 110) based, for instance, on a user command. Additional details regarding the auto-configuration of AV port(s) may be found in U.S. patent application Ser. No. 14/945,079, filed on Nov. 18, 2015 and entitled "Auto Detection and Adaptive Configuration of HDMI Ports," the entirety of which is incorporated by reference. Furthermore, additional details regarding the identification of electronic device(s) and the mapping of electronic device(s) to AV port(s) may be found in U.S. patent application Ser. No. 14/945,125, filed on Nov. 18, 2015 and entitled "Automatic Identification and Mapping of Consumer Electronic Devices to Ports on an HDMI Switch," the entirety of which is incorporated by reference.

System 100 may further comprise a receiver (not shown in FIG. 1) configured to receive command(s) that indicate that a user would like to use one or more of media device(s) 102A or 102B for providing and/or presenting content. In accordance with an embodiment, the receiver may receive control signals via a wired connection (e.g., via a Universal Serial Bus (USB) cable, a coaxial cable, etc.). In accordance with another embodiment, the control signals are transmitted via a wireless connection (e.g., via infrared (IR) communication, radio frequency (RF) communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.) and/or the like.

In accordance with an embodiment, a control device (not shown in FIG. 1) may transmit control signals to the receiver. For example, the control device may be a remote-control device, a desktop computer, a mobile device, such as a telephone (e.g., a smart phone and/or mobile phone), a personal data assistance (PDA), a tablet, a laptop, etc. In accordance with another embodiment, the control device is a dedicated remote-control device including smart features such as those typically associated with a smart phone (e.g., the capability to access the Internet and/or execute variety of different software applications), but without the capability of communicating via a cellular network.

A user may use the control device to select a source device and/or a sink device that the user would like to use for providing and/or presenting content. After making a selection, the control device may transmit a command to the receiver that includes an identifier of the selected source and/or sink devices. The identifier may include, but is not limited to, the type of the electronic device (e.g., a Blu-ray player, a DVD player, a set-top box, a streaming media player, a TV, a projector etc.), a brand name of the electronic device, a manufacturer of the electronic device, a model number of the electronic device, and/or the like.

The receiver may also be configured to receive one or more voice commands from a user that indicate one or more electronic device(s) (e.g., source media devices and/or sink media device(s) 102B) that a user would like to use for providing and/or presenting content. For example, the user may utter one or more commands or phrases that specify electronic device(s) that the user would like to use (e.g., "Watch DVD," "Watch satellite TV using projector," "Turn on streaming media device"). The command(s) may identify electronic device(s) by one or more of the following: a type of the electronic device, a brand name of the electronic device, a manufacturer of the electronic device, a model number of the electronic device and/or the like. In accordance with an embodiment, the receiver may comprise a microphone configured to capture audio signals. In accordance with such an embodiment, the receiver and/or another component of switching device 104 is configured to analyze audio signals to detect voice commands included therein. In accordance with another embodiment, the microphone is included in the control device. In accordance with such an embodiment, the control device is configured to analyze the audio signal received by the microphone to detect voice command(s) included therein, identify the electronic device(s) specified by the user, and/or transmit command(s) including identifiers for the identified electronic device(s) to the receiver. After receiving such command(s), receiver provides the identifier(s) included therein to a mapping component (not shown) in control logic 112. Based on the identifier(s) in the mapping component, control logic 112 may be configured to provide a control signal to switch circuit 106, which causes switch circuit 106 to connect the identified source AV port to the identified and/or determined sink AV port.

Switching device 104 may be further configured to transmit a control signal to any of source or sink media device(s) 102A or 102B. The control signal may be any type of signal to control one or more source or sink media device(s) 102A or 102B, such as a signal to control a power state, an input, an output, an audio setting, a video setting, or any other setting of source or sink media device(s) 102A or 102B. In embodiments, source and/or sink media device(s) 102A and/or 102B may be configured to receive control signals via any one or more communication protocols. For example, as shown in FIG. 1, switching device 104 may transmit to source or sink media device(s) 102A or 102B an IP control signal 116A via a network interface 116, or a control signal using any other suitable interface (not shown), such as an IR control signal, an RF control signal, or a control signal via an HDMI Consumer Electronics Control (HDMI-CEC) protocol over HDMI interface 108.

Network interface 116 is configured to enable switching device 104 to communicate with one or more other devices (e.g., source or sink media device(s) 102A or 102B) via a network, such as a local area network (LAN), wide area network (WAN), and/or other networks, such as the Internet. In accordance with embodiments, network interface 116 may transmit an IP control signal 116A over the network to control one or more functions of source or sink media device(s) 102A or 102B. Network interface 116 may include any suitable type of interface, such as a wired and/or wireless interface. In embodiments, network interface 116 may further enable switching device 104 with two-way communication with one or more remote (e.g., cloud-based) systems (not shown in FIG. 1). For instance, a remote system, such as a cloud-based server, may identify, via a data structure (e.g., a database or the like), one or more device signatures corresponding to media device brands, makes, and/or models. The data structure may be accessed via network interface 116 during the automatic identification techniques described herein, or may be stored in storage 126.

Storage 126 may be one or more of any storage device described herein, such as, but not limited to, those described below with respect to FIG. 8. Storage 126 may include a device signature storage 128 as shown in FIG. 1. Device signature storage 128 may comprise, for instance, device signatures corresponding to one or more device brands, makes, and/or models. In accordance with embodiments, device signature storage 128 may include a data structure (e.g., a table/database, or the like) that identifies commonly available devices (e.g., such as a repository) that may be mapped to a device signature generated or received by switching device 104 from one of sink media device(s) 102B. For instance, device signature storage 128 may indicate that a particular model of a sink media device (or a device acting as a sink media device) comprises a particular device signature based on the sink media device's identification data (e.g., EDID information) or attributes (e.g., attributes such as or capabilities of the device) identified therein. Device signatures, as used herein, may comprise any set of information that may correspond, or be based on, identification data received from a sink media device. In one example, the device signature may comprise a subset of attributes comprised in the identification data, may comprise all of the attributes identified therein, or may comprise a unique set of information (e.g., a string of bits or the like) generated using some or all of the received identification data.

In some further examples, device signature storage 128 may also comprise a device map that is configured to map a device signature and/or attributes contained therein to each device coupled to switching device 104. For instance, the device map may identify each of the coupled sink media device(s) 102B (by a name, model, etc.), along its associated device signature, and the port to which the device is coupled. For instance, if the identification data received from a sink media device (e.g., a TV) indicates that the TV is capable of a 4K video resolution (i.e., 3840×2160 pixels), such an indication may be stored in the device map (e.g., as an individual attribute or in any other form, such as a signature). In embodiments, device signature storage 128 may be stored either locally within storage 126 and/or remotely (e.g., on a cloud-based server).

Control logic 112 may include media device identifier 114 configured to automatically identify a media device based on identification data received from one of source or sink media device(s) 102A or 102B. In some further examples, media device identifier 114 may be configured to automatically determine a power state of one or more sink media device(s) 102B based on the identification data received from one or more port(s) 110. Media device identifier 114 will be described in greater detail below.

Figure 2:
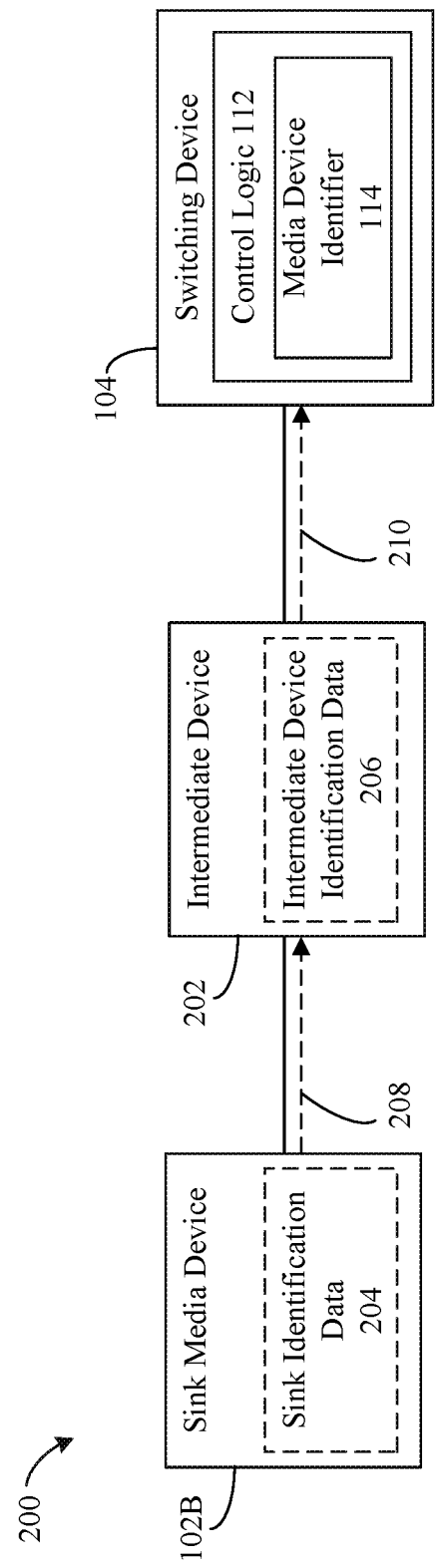
FIG. 2 is a block diagram of an example arrangement of multimedia devices in which device identification techniques described herein may be implemented, according to an example embodiment.

Implementations are not limited to any particular arrangement of media devices, and may comprise other arrangements not expressly shown in FIG. 1. For example, FIG. 2 shows a block diagram of an example arrangement of multimedia devices in which device identification techniques described herein may be implemented. As shown in FIG. 2, system 200 includes a sink media device 102B, an intermediate device 202, and switching device 104. Sink media device 102B shown in FIG. 2 comprises sink identification data 204. Intermediate device 202 comprises intermediate device identification data 206. In implementations, media device identifier 114 may receive identification information 210 that comprises sink identification data 204, intermediate device identification data 206, and/or modified identification information that is modified by intermediate device that includes attributes of both intermediate device 202 and sink media device 102B. For instance, when intermediate device 202 is powered on, intermediate device 202 may be configured to modify, add, and/or remove certain attributes of sink identification data 204 based on its own capabilities when transmitting identification data to media device identifier 114. Where intermediate device 202 is powered off, intermediate device 202 may pass through sink identification data 204 to media device identifier 114 without modification.

Based on the identification information 210 received, media device identifier 114 may be configured to identify the devices coupled to switching device 104, and/or determine a power state of one or more of such devices. For instance, as shown in FIG. 2, if media device identifier 114 identifies attributes associated with sink device 102B (e.g., sink identification data 204) but not intermediate device 204, media device identifier 114 may determine that sink media device 102B is powered on but intermediate device 202 is powered off. Similarly, if media device identifier 114 identifies attributes associated with intermediate device 202 (e.g., intermediate device identification data 206) but not sink media device 102B, media device identifier 114 may be configured to determine that intermediate device 202 is powered on while sink media device 102B is powered off. Where identification information 210 received by media device identifier 114 modified identification information that includes attributes of a plurality of devices (e.g., attributes contained in sink identification data 204 and intermediate identification data 206), media device identifier 114 may determine that both sink media device 102B and intermediate device 202 are powered on. In this manner, media device identifier 114 may automatically determine the power state of one or more coupled devices automatically.

It is noted and appreciated that any number of sink media devices and/or intermediate devices may be present in implementations. For instance, intermediate device 202 may comprise a switching device (including but not limited to a repeater such as an AVR) that includes a plurality of sink outputs, each such output being coupled to a separate sink device (e.g., a display device). In other examples, switching device 104 may be coupled to additional sink devices (e.g., directly or indirectly through one or more other intermediate devices not shown), such that media device identifier 114 may receive identification information from a plurality of sink devices and/or intermediate devices. Accordingly, implementations are not intended to be limiting to any particular arrangement, and may include any other device arrangement that is not shown in FIG. 1 and/or FIG. 2.

Furthermore, although one or more components in accordance with the automatic identification techniques described herein are illustrated as part of switching device 104, it is understood and appreciated that the automatic identification of a device may be carried out by any type of media device (e.g., a source media device, a sink media device, or a switching device). For example, any one of source or sink media device(s) 102A or 102B may comprise media device identifier 114 and/or storage 126 as described herein. In embodiments, therefore, any type of media device may automatically identify another media device using information obtained from the other media device, e.g., over a multimedia cable.

Figure 3:
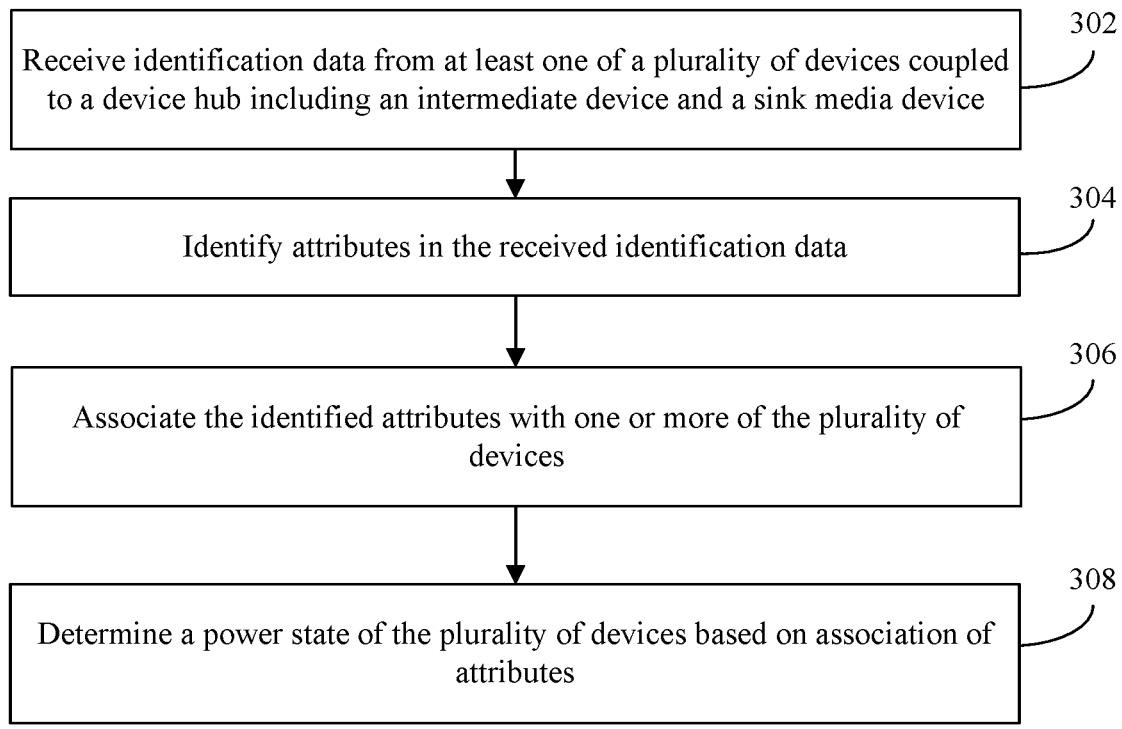
FIG. 3 is a flowchart of a method for determining a power state of one or more coupled devices, according to an example embodiment.
Figure 4:
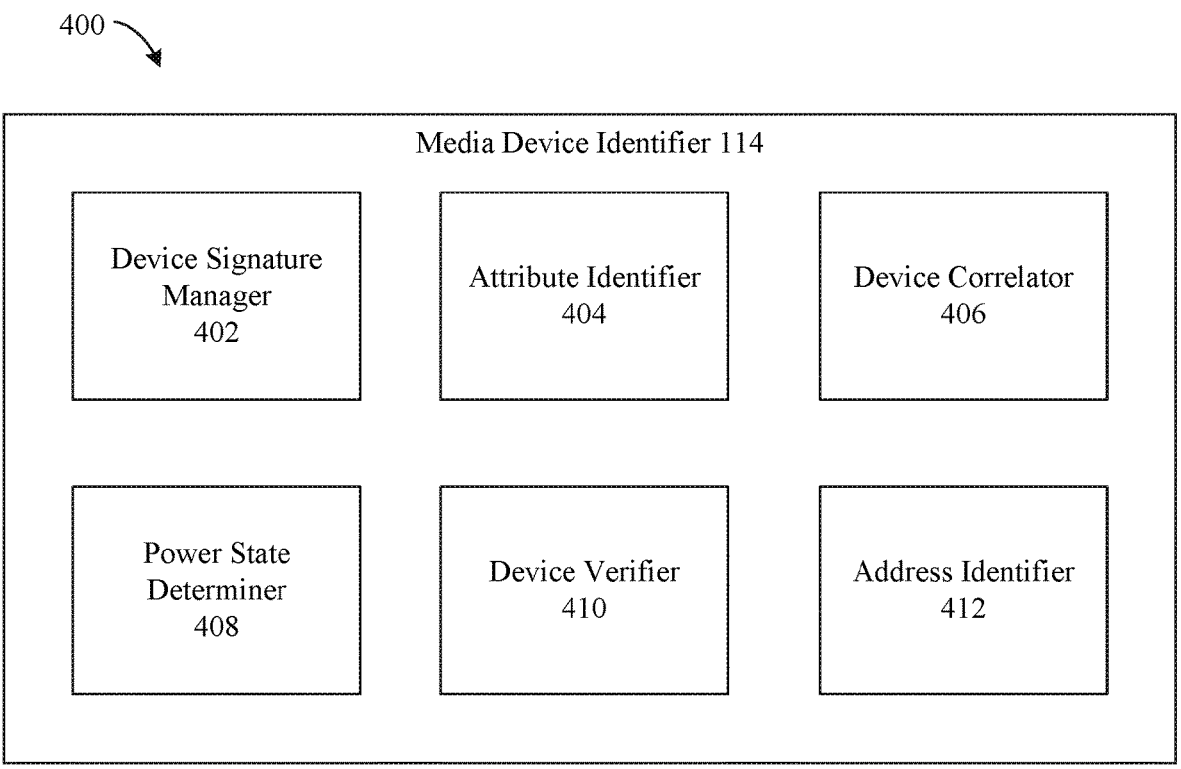
FIG. 4 is a block diagram of a media device identifier, according to an example embodiment.

As described above, media device identifier 114 may be configured to automatically identify and/or determine a power state of one or more coupled devices in examples. For instance, FIG. 3 shows a flowchart 300 of a method for determining a power state of one or more coupled devices, according to an example embodiment. The method of flowchart 300 will now be described with continued reference to the systems of FIGS. 1 and 2, although the method is not limited to that implementation. For illustrative purposes, flowchart 300 and media device identifier 114 are described as follows with respect to FIG. 4. FIG. 4 shows a block diagram of a system 400 comprising media device identifier 114, according to an example embodiment. As shown in FIG. 4, media device identifier 114 incudes a device signature generator 402, an attribute identifier 404, a device correlator 406, a power state determiner 408, a device verifier 410, and an address identifier 412. Other structural and operational embodiments will be apparent to persons skilled in the relevant art(s) based on the discussion regarding flowchart 300 and the system of FIG. 4. Flowchart 300 and system 400 are described in further detail as follows.

As shown in FIG. 3, the method of flowchart 300 begins at step 302. In step 302, identification data is received from at least one of a plurality of devices coupled to a device hub, the plurality of devices including an intermediate device and a sink media device. For instance, with reference to FIGS. 1, 2 and 4, device signature manager 402 that may be implemented as part of switching device 104 may be configured to receive identification information 210 from at least one of a plurality of devices coupled to the switching device. The plurality of devices may include, for instance, sink media device 102B (such as display device) and intermediate device 202 (such an AVR or other repeater or switch), as shown in FIG. 2. In some example embodiments, intermediate device 202 may be coupled to one of port(s) 110 of switching device via a first multimedia cable (e.g., an HDMI cable or other suitable interface), and sink media device 102B may be coupled to intermediate device 202 via a second multimedia cable. In other words, dink media device 102B may be coupled to switching device 104 indirectly, or via intermediate device 202. Such an arrangement is illustrative only, and other arrangements are also contemplated.

Device signature manager 402 may receive identification information 210 via one or more port(s) 110 of switching device 104. For example, where port(s) 110 comprise HDMI ports, identification information 210 may be received over one or more control signal lines of an HDMI cable coupled to one of port(s) 110. In some further examples, identification information may EDID associated with one or more coupled devices. Implementations, however, are not limited to receiving identification information 210 via an HDMI cable or as EDID, and may include receiving identification information in any other manner via any suitable multimedia cable.

Device signature manager 402 may be configured to receive identification information 210 in a predetermined format, structure, or arrangement (e.g., as a signature) or generate a signature based on identification information 210. For instance, the device signature may comprise a string of bits, such as a string of 1s and 0s. The device signature may optionally be generated as a hash value that is a hash of the received identification information (generated based on a hash function). In other embodiments, the generated device signature may comprise any other suitable format or representation of the identification data. The device signature may include, but is not limited to any attribute (e.g., parameter, characteristic, or capability) of a coupled device, such as one of sink media device(s) 102B or another device acting as a sink device (e.g., an intermediate device in some examples). In some example embodiments, the signature comprises a set of attributes of a coupled device (or a plurality of coupled devices). Given that different media devices will typically contain different attributes, the received or generated device signature comprise a unique device signature for each brand, make, or model of sink media device connected to switch 104.

As described above, identification information 210 may comprise sink identification data 204, intermediate device identification data 206, or a combination of sink identification data 204 and intermediate device identification data 206 depending on which devices may be powered on or off at a given time. For instance, where both intermediate sink media device 102B and intermediate device 202 are powered on, intermediate device 202 may be configured to generate modified identification information that includes attributes of sink media device 102B and intermediate device 202. In some examples, the modified identification information generated by intermediate device 202 may be a combination of one or more attributes from sink identification data 204 and intermediate device identification data 206.

In step 304, attributes are identified in the received identification data. For instance, with reference to FIG. 4, attribute identifier 404 may be configured to identify one or more attributes in identification information 210 received by one of port(s) 110. Attributes may include, for example, any one or more device attributes identified in identification information 210. In some implementations, attribute identifier 404 may identify display-related attributes of one or more devices coupled to the cable over which the information is received, such as signaling parameters, display parameters, supported resolutions, luminance/chromaticity data, input types, date of manufacture (e.g., week or year of manufacture), version number, synchronization data, color data, audio capability information (e.g., number of audio channels), a manufacturer name, a display or monitor name, a product code, a serial number, a product type, and/or any identification or EDID information.

As noted, above, however, even though the devices coupled to a given port may not change, the received identification information 210 may vary depending on which devices are powered on at a given time. Accordingly, attribute identifier 404 may be configured to parse identification information 210 to identify or determine such attributes in the received information.

In step 306, the identified attributes are associated with one or more of the plurality of devices. For instance, with reference to FIG. 4, device correlator 406 may associate attributes identified by attribute identifier 404 with one or more of the plurality of devices (e.g., sink device 102B and/or intermediate device 202 as shown in the illustrative example of FIG. 2). As discussed above, device signature storage 128 may be configured to store a mapping of devices and identification information (e.g., attributes) for each such device. For example, a particular sink device identified in device signature storage 128 may be associated with one or more attributes (such as a set of attributes or other device signature). In one illustration, device signature storage 128 may associate a particular supported video resolution with one sink device, while associating a different video resolution for a different sink device based on each device's capabilities identified by their respective identification information. Accordingly, upon parsing the received identification 210, device correlator 406 may associate each identified attribute with one or more of the plurality of devices based on the information previously stored for such devices. In some other examples, device correlator 406 may associate a set of attributes (e.g., certain audio and/or video capabilities) with one or more of the plurality of devices.

In step 308, a power state of the plurality of devices is determined based on the association of attributes. For instance, with reference to FIG. 4, power state determiner 408 may be configured to determine a power state of one or more of the plurality of coupled devices based on the association of attributes by device correlator 406. For example, if device correlator 406 associates the identified attributes with sink device 102B, but no attributes are associated with intermediate device 202 (or any other coupled device), power state determiner 408 may determine that sink device 102B is presently powered on, while intermediate device 202 is presently powered off. In another example, if device correlator 406 associates the identified attributes with intermediate device 202 but none of the attributes are associated with sink device 102B (or any other coupled device), power state determiner 408 may determine that intermediate device 202 is powered on, while sink device 102B is powered off.

In yet another illustration, device correlator 406 may associate identified attributes with a plurality of devices. For instance, after parsing identification information 210, device correlator 406 may determine that the identified attributes correspond to multiple devices. This may occur, for instance, in situations where an intermediate device may receive identification data (e.g., sink identification data 204 as shown in FIG. 2), and include or substitute its own identification information (e.g., some of intermediate device identification data 206) to generate modified identification information. As a result, the modified identification information may comprise attributes associated with a plurality of devices. Where device correlator 406 associates such attributes with the plurality of devices (as opposed to a single device, for instance), power state determiner 408 may determine that the plurality of devices is currently powered on. In the illustration of FIG. 2, for example, power state determiner 408 may determine that both sink device 102B and intermediate device 202 are powered on where device correlator 406 associates the identified attributes with both such devices.

As a non-limiting illustration, a multimedia switching device such as a media device hub (or a source device, or any other device in which media device identifier 114 may be implemented) may be coupled to sink device (e.g., a display device) via an intermediate media device (e.g., AVR, a repeater, etc.) through via a multimedia cable chain. In some examples, the AV chain may comprise first and second multimedia cables (e.g., HDMI cables), as shown in the illustrative arrangement of FIG. 2. In such an embodiment, the media device hub may determine a power state of either the sink media device and/or the intermediate media device based on the identification data received via the multimedia cable. For instance, where the intermediate device is powered off and the sink media device is powered on, the media device hub may receive identification data of the sink media device over the multimedia cable. Where the intermediate device is powered on and the sink media device is powered off, the media device hub may receive identification data corresponding to the intermediate device over the multimedia cable. Where both devices are powered on, the media device hub receives identification data that comprises information of both the intermediate device and the sink media device. For instance, the received identification data may be combination or mixture of the identification data of the intermediate media device and the sink media device, or may comprise both sets of identification data.

In this manner, based on the information received, media device identifier 114 may determine the power state of a plurality of coupled devices in an automatic fashion. As a result, switching device 104, or any other device that may implement media device identifier 114, may intelligently control each coupled device in the appropriate manner. For instance, if switching device 104 determines that a particular sink device is powered off that may cause a network interface of the sink device to be inoperable, switching device 104 may be configured to utilize a particular communication protocol to power on the device (e.g., an infrared protocol, rather than an IP protocol) until the interface is functional. In another example, by determining the power state of various devices, duplicate power commands need not be transmitted to such devices, avoiding the likelihood of unintentionally power cycling a device when it is already powered on or off.

Figure 5:
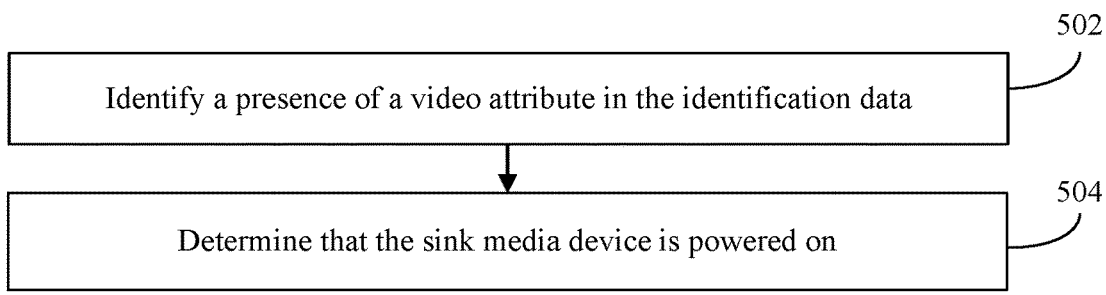
FIG. 5 is a flowchart of a method for determining whether a sink media device is powered on, according to an example embodiment.

In accordance with example embodiments, power state determiner 408 may determine a power state of a coupled device in various ways. For instance, FIG. 5 is a flowchart of a method for determining that a sink media device is powered on, according to an example embodiment. For illustrative purposes, FIG. 5 will be described with continued reference to systems 100, 200, and 400 of FIGS. 1, 2, and 4, respectively. Other structural and operational embodiments will be apparent to persons skilled in the relevant art(s) based on the discussion regarding flowchart 500 and the systems of FIGS. 1, 2, and 4. Flowchart 500 and systems 100, 200, and 400 are described in further detail as follows.

Flowchart 500 begins with step 502. In step 502, a presence of a video attribute is identified in the identification data. As described above, identification information 210 may comprise a plurality of attributes relating to the and/or properties of one or more devices coupled to a multimedia cable. As an example, the one or more video attributes may comprise any one or more of a display or monitor name, display parameters, supported resolutions, luminance/chromaticity data, color data, HDR support, or any other parameter associated with video playback.

In some examples, identification information 210 may comprise one or more of such video attributes where a sink device capable of playing video content is powered on. For instance, a television or a projector, when powered on, may transmit identification information that comprises one or more of such video attributes, while other sink devices without video capabilities (such as sound bars, speakers, etc.) may not transmit identification information that comprises video attributes. With reference to FIG. 3, power state determiner 408 may be configured identify one or more of such video attributes (or a presence thereof) in the received identification information 210.

In step 504, it is determined that the sink media device is powered on based on the presence of the video attribute. For instance, with reference to FIG. 4, power state determiner 408 may determine that a sink device from which identification information 210 is received is powered on. For example, where a plurality of devices may be coupled in a chain, such as the illustrative arrangement shown in FIG. 2, identification information may comprise various different sets of attribute information based on which of the devices in the chain is powered on at a given time.

In examples where power determiner 408 identifies a video attribute (or a presence thereof) in identification information 210, power determiner 408 may determine that a sink device capable of displaying video content is at least powered on. For instance, even if the sink device (e.g., sink device 102B) is coupled to a media device hub via an intermediate device, when the sink device is powered on, identification information 210 received by the media device hub may comprise video attributes of the sink device whether the intermediate device is powered on or off. As a result, based on the presence of a video attribute in identification information 210, power determiner 408 may automatically determine the power state of a sink device, even though the media device hub may not be directly coupled to the sink device in some arrangements.

In some further examples, such as where the intermediate device may be coupled to a plurality of sink devices, power state determiner 408 may further be configured to determine which of the plurality of sink devices are powered on or powered off based on associating one or more video attributes identified in identification information 210 with a device map of storage 126. In an illustrative example, if a television coupled to an AVR was capable of a first resolution while a projector also coupled to the AVR was capable of a second resolution, identification of which supported resolution is present (if any) in identification information 210 may enable power state determiner 410 to determine which of the sink devices coupled to the AVR is presently powered on.

Figure 6:
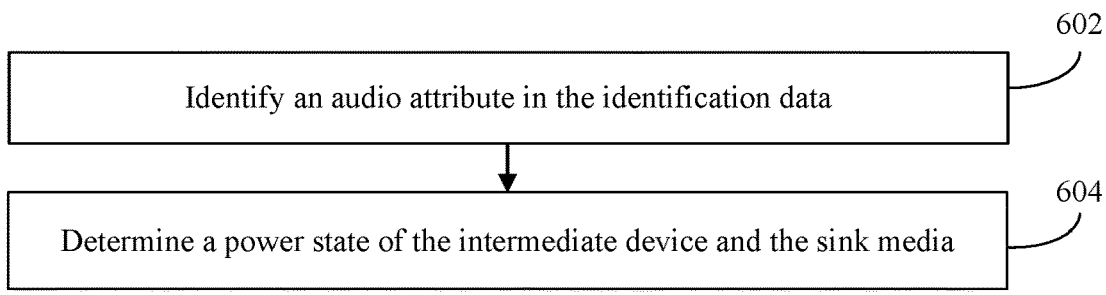
FIG. 6 is a flowchart of a method for determining a power state of an intermediate device and a sink media device, respectively, according to an example embodiment.

In accordance with some example embodiments, power state determiner 408 may determine a power state of a coupled device in various other ways. For instance, FIG. 6 is a flowchart of a method for determining a power state of an intermediate device and a sink media device, respectively, according to an example embodiment. For illustrative purposes, FIG. 6 will be described with continued reference to systems 100, 200, and 400 of FIGS. 1, 2, and 4, respectively. Other structural and operational embodiments will be apparent to persons skilled in the relevant art(s) based on the discussion regarding flowchart 600 and the systems of FIGS. 1, 2, and 4. Flowchart 600 and systems 100, 200, and 400 are described in further detail as follows.

Flowchart 600 begins with step 602. In step 602, an audio attribute is identified in the received identification data. For instance, as described above, identification information 210 may comprise a plurality of attributes relating to the and/or properties of one or more devices coupled to a multimedia cable, including video attributes, audio attributes, or both, depending on the power state of each of the coupled devices. In examples, power state determiner 408 may identify one or more of such audio attributes in the received identification data, such as the number of supported channels (e.g., 5.1, 7.1, 8.1, etc.), other surround sound capabilities, or any other audio-related parameters.

In some instances, power state determiner 408 may identify one or more audio attributes in identification information 210 without identifying any video attributes described above. For example, an AVR that is presently playing back only audio content (e.g., via a streaming music service, a compact disc player, a portable music device, etc.) may transmit identification data of the AVR that identifies audio capabilities of the AVR but does not identify any associated video attributes.

In step 604, a power state of an intermediate device and of a sink media device is determined based on the identification of the audio attribute. For instance, with reference to FIG. 4, power state determiner 408 may determine the power state of intermediate device 202, and the power state of sink media device 102B based on the identified audio attribute. For example, where a plurality of devices may be coupled in a chain, such as the illustrative arrangement shown in FIG. 2, audio attributes included in identification information 210 may be different based on which devices are powered on at a given time.

In one illustrative example, sink media device 102B may be a television with a certain video resolution and audio capability (e.g., 2 channel audio), and intermediate device 202 may be an AVR (without any video playback capability but comprising 8-channel audio capability). In this example, if power state determiner 408 identifies audio attributes indicating a 2-channel audio capability, power state determiner 408 may automatically determine that the television is powered on while the AVR is powered off. Conversely, if power state determiner 408 identifies audio attributes indicating an 8-channel audio, power state determiner 408 may automatically determine that AVR is powered on. Furthermore, based on the video attribute information in the latter illustration, power state determiner 408 may also be configured to determine a power state of the TV (e.g., by determining that the TV is powered on if video attributes are identified, or powered off if video attributes are not identified). Accordingly, by identifying and correlating which attributes are present in the received identification information, a device may determine a power state of other devices coupled to it, even if not directly coupled.

Figure 7:
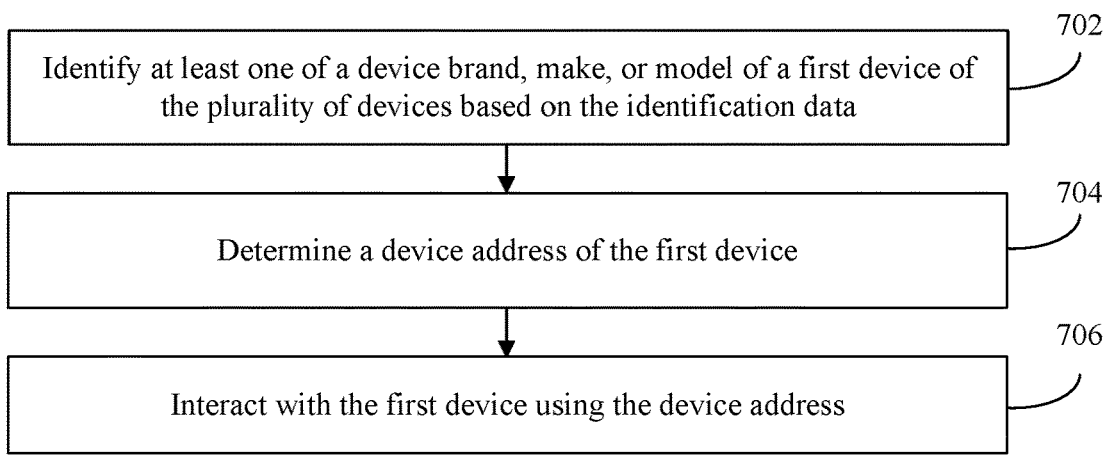
FIG. 7 is a flowchart of a method for determining a device address using a device brand, make, or model, according to an example embodiment.

In accordance with some implementations, media device identifier may also be configured to identify a device brand, make, and/or model of a coupled device. For instance, FIG. 7 depicts a flowchart 700 of a method for determining a device address using a device brand, make, or model, according to an example embodiment. For illustrative purposes, FIG. 7 will be described with reference to systems 100, 200, and 400 of FIGS. 1, 2, and 4, respectively. Other structural and operational embodiments will be apparent to persons skilled in the relevant art(s) based on the discussion regarding flowchart 700 and the systems of FIGS. 1, 2, and 4. Flowchart 700 and systems 100, 200, and 400 are described in further detail as follows.

Flowchart 700 begins with step 702. In step 702, a device brand, make, or model of a first device of the plurality of devices coupled to a media device hub is identified based on received identification data. For instance, with reference to FIGS. 1 and 4, device correlator 406 may be configured to identify a device brand, a device make, and/or a device model of one of the plurality of devices coupled to one of port(s) 110 of switching device 104 based on identification data received from the device.

In example implementations, device correlator 406 may identify a device brand, make, and/or model in various ways. For instance, as described above, device signature manager 402 may be configured to receive identification data 108A from one of sink media device(s) 102B over one of port(s) 110 upon connecting and powering on the sink media device to the corresponding AV port. Device signature manager 402 may receive identification data as a set of information (e.g., as a device signature). In some example embodiments, identification data 108A may comprise EDID information of the sink media device as described herein, but examples are not limited to this implementation.

In some example embodiments, device signature manager 402 may generate a device signature based on the display identification data. Because media devices typically do not comprise the same set of identification data, the device signature (or received signature, as described previously) may comprise a unique string that may be associated with a particular device brand, make, and/or model. For instance, the device signature may comprise a unique string of bits, such as a string of 1s and 0s based on the set of information contained within the display identification data. In other embodiments, the device signature may comprise a collection or combination of alphanumeric characters, a numeric code (e.g., a set of integers), and/or a descriptive text (e.g., one or more phrase(s), word(s), term(s), or abbreviations thereof). It is also contemplated herein that device signatures may comprise the same format (e.g., same data structure comprising the same fields), may comprise the same length (e.g., a predetermined or predefined length for all device signatures), or the device signatures may comprise different lengths, based in part for example, on information contained within the identification data.

In some embodiments, device signature manager 402 may generate a device signature that may take into account the entire set of data contained within the received identification data or may take into account a subset of the data contained within the received identification data (e.g., certain fields contained in the set of data). For instance, the device signature may be based on fields contained in the set of data that are expected to be unique for different devices. Because different media devices will typically contain different attributes, device signature may be unique for each brand, make, or model of media devices that may be coupled to switching device 104. Furthermore, because each device signature is based on the identification data associated with a particular sink media device, the device signature may be generated in manner that is reproducible for the same set (or subset) of identification data. For instance, if two identical sink media devices are coupled to switching device 104, device signatures for the identical sink media devices may be the same because the display identification data for the two devices is identical. However, in example embodiments, signatures for the two otherwise identical media devices may also be generated in a manner such that different device-specific identifiers (e.g., serial numbers, IP addresses, etc.) are also taken into account, and thus lead to different device signatures to be generated for the two sink media devices.

In some other example embodiments, device signatures may be based on identification data attributes that are located in different blocks, segments, or portions of the data structure comprising the identification data. For instance, a particular sink media device may comprise a plurality of device signatures, each signature being based on a separate each block, segment, or portion of the data structure resembling the identification data. In embodiments, the device signature may therefore comprise a plurality of signature portions, each device signature portion (e.g., one or more alphanumeric characters, numbers, or descriptive text) corresponding to a parameter contained within the identification data and arranged in a non-random location (e.g., a predetermined or predefined block or segment) within the overall device signature. It is noted, however, that these examples are illustrative only, and any other manner of generating or obtaining a device signature in any format or structure is contemplated.

In examples, device correlator 406 may be configured to determine whether the device signature for a coupled sink media device correlates to a device brand, make, and/or model. For instance, with reference to FIGS. 1 and 4, device correlator 406 may be configured to reference a data structure, such as device signature storage 128 (which may be stored locally in one of storage 126 or may be obtained from a remotely located device, such as a cloud-based server) to determine whether the device signature correlates to a device brand, make, and/or model in the data structure.

For instance, as discussed above, device signature storage 128 may contain a repository of previously generated signatures for commonly available device brands, makes, and/or models. A repository may be generated in various ways. For instance, identification data may be obtained from a sink device (e.g., one of sink media device(s) 102B) as described herein. In some examples, a signature may also be generated for the sink device as described above. The identification data and/or device signature for the sink device may then be stored as a data structure (e.g., a database or table, or the like) in a repository that associates the identification data with a device brand, make, and/or model. In examples, the repository may be stored in device signature storage 128 or in a remotely located storage (e.g., on a cloud-based server), and/or may be transmitted to any other device, such as another switching device 104. Accordingly, when a sink media device (or a device acting as a sink media device) is connected to switching device 104 and identification data is obtained, device correlator 406 may be configured to reference device signature storage 128 to locate a matching identification data corresponding to the received identification data. If device correlator 406 determines that the device signature correlates to a device brand, make, and/or model in device signature storage 128, device correlator 406 may thereby identify the sink media device coupled to switching device 104.

In some further implementations, once device correlator 406 identifies a device brand, make, and/or model, device verifier 410 may be configured to verify the device brand, make, and/or model in one or more ways. For instance, device verifier 410 may analyze a signal (e.g., a control signal or any other type of signal) that may be transmitted via the multimedia cable to confirm that the connected sink media device corresponds to the determined device brand, make, and/or model. In some other examples, device verifier 410 may be configured to prompt a user via an interface to verify the automatically identified device brand, make, and/or model. Device verifier 410 may also perform one or more other automatic identification techniques to verify the identity of a coupled device, such as those described in U.S. patent application Ser. No. 14/945,125, filed on Nov. 18, 2015 and entitled "Automatic Identification and Mapping of Consumer Electronic Devices to Ports on an HDMI Switch," the entirety of which is incorporated by reference.

In yet some other example implementations, device correlator 406 may further determine, based on the device signature and a device map stored in storage 126, whether the connected sink media device was previously connected to switching device 104. For instance, upon connecting one of sink media device(s) 102B (or a device acting as a sink media device) to switching device 104, the received identification data (or a subset thereof), a signature generated therefrom, a flag or other type of identifier may be stored in a device map indicating that the sink device has been connected to the switching device 104. In some implementations, the device map may also identify a port of port(s) 110 to which the sink media device was previously coupled. If this sink media device is disconnected (e.g., by unplugging HDMI interface 108) from one of port(s) 110 and later reconnected to the same port or a different port, device correlator 406 may obtain a device signature (or regenerate a device signature) in a similar manner as discussed above, and determine, based on the generated device signature and a flag or identifier stored in device signature storage 128, that the sink media device was previously connected. In this manner, additional device identification procedures may be avoided, thereby increasing the speed of the automatic identification techniques described herein and avoiding further reconfiguration of switching device 104.

In step 704, a device address of the first device is determined. For instance, with reference to FIG. 4, address identifier 412 may be configured to determine a device address of the device for which a device brand, make, or model is identified (i.e., the first device). In examples, address identifier 412 may be configured to determine a media access control (MAC) address, an IP address, a Bluetooth™ address, or any other address of the first device. For example, if device correlator 120 determines that the first device 102B an IP-connected television or a repeater, address identifier 412 may utilize an appropriate method to locate one or more televisions or repeaters on a network coupled to switching device 104 (e.g., by carrying out one or more network discovery techniques, broadcasting a ping on the network to locate media devices on the network, etc.). In response to locating one or more televisions or repeaters coupled to the network, address identifier 412 may thereby identify the MAC and/or IP address of the device that corresponds to the identified brand, make, or model. In some examples, if more than one device is located on the network (e.g., if the network contains more than one television or repeater), switching device 104 may also be configured to prompt a user, via a user interface (not shown) to select the appropriate device coupled to switching device 104 such that address identifier 412 may associate the appropriate address for the first device.

In some other examples, address identifier 412 may also be configured to browse other types of networks, such as Bluetooth™ networks where the first device is known to comprise Bluetooth capabilities. For instance, address identifier 412 may be configured to determine that certain brands, makes, and/or models of sink devices are capable of communicating via Bluetooth™ communication signals. Based on such a determination, address identifier 412 may automatically attempt to locate and pair to nearby devices. It is noted, however, that examples are not limited to determining a MAC, IP, or Bluetooth™ address, but may include other types of device addresses as well.

In step 706, the first device is interacted with using the device address. For instance, with respect to FIG. 1, switching device 104 may be configured to interact with the first device (e.g., one of sink media device(s) 102B) via network interface 116 or any other communication protocol. For example, using a MAC, IP, or Bluetooth™ address, network interface 116 may be configured to transmit one or more control signals 116A to the first device. Control signal 116A may comprise any type of command to control the first device, such as a signal to control a power state, an input, an output, an audio setting, a video setting, or any other setting of the first device. As a result, by implementing the automatic identification techniques described herein, a device, such as a switching device, may be automatically configured to set up a communication protocol with the first device and utilize the communication protocol to control the first device.

It is noted that although the techniques are described for enabling a switching device (e.g., switching device 104 acting as a source device) to automatically identify another device (one of sink media device(s) 102B), the techniques herein are not limited to that implementation. For instance, other media devices (e.g., any one of source media device(s) 102A, such as a streaming media device or a gaming console, or an AVR, repeater, etc.) may implement control logic 112, storage 126, and network interface 116 in accordance with embodiments. Accordingly, any media device (e.g., a device acting as a source media device such as a streaming media device or a gaming console, or an AVR, a repeater, a switching device, etc.) may automatically identify a sink media device (e.g., any device acting as a sink media device, such as a television, or a switching device, AVR, repeater, etc.) and its power state and/or device address in accordance with the techniques described herein.

By way of a non-limiting example, a brand, make, and/or model of a sink media device (e.g., a television or projector) may be automatically identified by a source device media device (e.g., a streaming media player, such as a Roku® streaming media device) coupled to the sink media device (e.g., via an HDMI cable) using the disclosed techniques. In another embodiment, a brand, make, and/or model of a sink media device may be automatically identified by a repeater device (e.g., an AVR or a multimedia switching device) coupled via a multimedia cable. In yet another embodiment, a brand, make, and/or model of a repeater device (e.g., a television or a projector in some instances) may be automatically identified by another repeater device (e.g., an AVR or a multimedia switching device acting as a source device) coupled via a multimedia cable. In yet another embodiment, a brand, make, and/or model of a repeater device (e.g., an AVR or a multimedia switching device acting as a sink device) may be automatically identified by another repeater device (e.g., a gaming console, such as an Xbox® gaming console acting as a source device) in accordance with the techniques described herein. Other implementations are also contemplated, including identifying devices based on arrangements with one or more intermediate devices or any other arrangement in which a source device (or a device acting as a source device) may receive identification data from a sink device (or a device acting as a sink device).

III. Further Example Embodiments and Advantages

One or more embodiments described herein may perform their functions according to the flowcharts described herein.

Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

The device identification and/or power state determination embodiments and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

Figure 8:
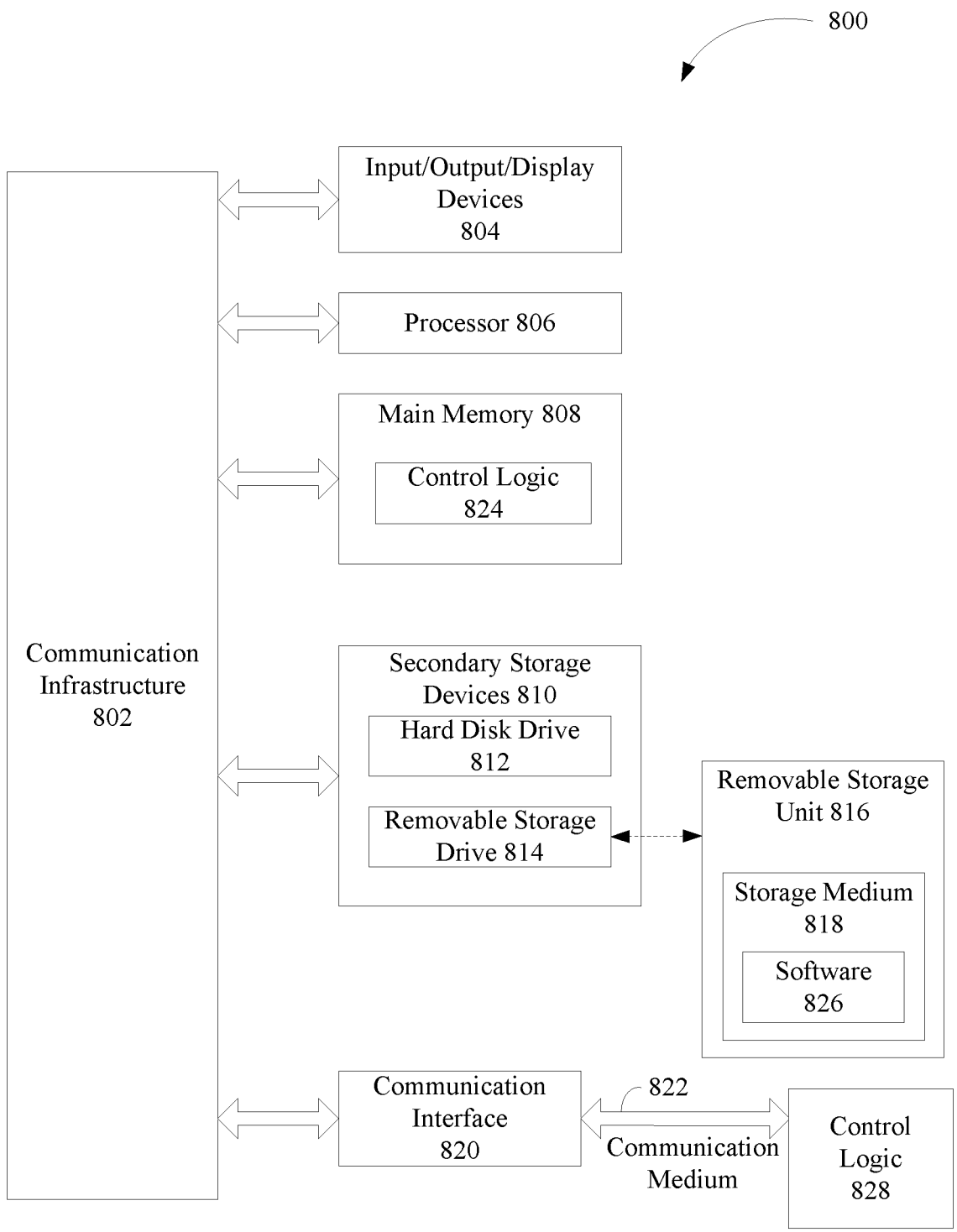
FIG. 8 is a block diagram of an example computer system in which embodiments may be implemented.

The embodiments described herein, including systems, methods/processes, devices, and/or apparatuses, may be implemented using well known processing devices, telephones (smart phones and/or mobile phones), tablet computers, servers, and/or, computers, such as a computer 800 shown in FIG. 8. It should be noted that computer 800 may represent communication devices, processing devices, servers, and/or traditional computers in one or more embodiments. For example, the device identification and/or power state determination embodiments, and any of the sub-systems or components respectively contained therein, may be implemented using one or more computers 800 or portions thereof.

Computer 800 can be any commercially available and well-known communication device, processing device, and/or computer capable of performing the functions described herein, such as devices/computers available from International Business Machines®, Apple®, Sun®, HP®, Dell®, Cray®, Samsung®, Nokia®, etc. Computer 800 may be any type of computer, including a desktop computer, a server, etc.

Computer 800 includes one or more processors (also called central processing units, or CPUs), such as a processor 806. Processor 806 is connected to a communication infrastructure 802, such as a communication bus. In some embodiments, processor 806 can simultaneously operate multiple computing threads.

Computer 800 also includes a primary or main memory 808, such as random-access memory (RAM). Main memory 808 has stored therein control logic 824 (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well-known manner.

Computer 800 also includes input/output/display devices 804, such as touchscreens, LED and LCD displays, monitors, keyboards, pointing devices, etc.

Computer 800 further includes a communication or network interface 818. Communication interface 820 enables computer 800 to communicate with remote devices. For example, communication interface 820 allows computer 800 to communicate over communication networks or mediums 822 (representing a form of a computer useable or readable medium), such as LANs, WANs, the Internet, etc. Network interface 820 may interface with remote sites or networks via wired or wireless connections.

Control logic 828 may be transmitted to and from computer 800 via the communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent embodiments of the invention.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, IR, and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 8) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 806 of FIG. 8), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

It is noted that while FIG. 8 shows a server/computer, persons skilled in the relevant art(s) would understand that embodiments/features described herein could also be implemented using other well-known processor-based computing devices, including but not limited to, smart phones, tablet computers, netbooks, gaming consoles, personal media players, and the like.

IV. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A multimedia device comprising:
   a storage device containing a device map that maps, to each of a plurality of devices coupled to the multimedia device, an identification of an attribute indicated in identification data received from the device, wherein the plurality of devices includes an intermediate device coupled to the multimedia device via a first multimedia cable, and a sink media device coupled to the intermediate device via a second multimedia cable;
   a multimedia port configured to receive identification data from at least one of the plurality of devices;

an attribute identifier configured to identify attributes in the received identification data;
a device correlator configured to associate the identified attributes with one or more of the plurality of devices using the device map; and
a power state determiner configured to determine a power state of the plurality of devices based on the association of the identified attributes using the device map, the determined power state for each device indicating whether the device is powered on or powered off.

2. The multimedia device of claim 1, wherein the identification data comprises Extended Display Identification Data (EDID).

3. The multimedia device of claim 1, wherein the received identification data comprises modified identification information, the modified identification information generated by the intermediate device and including attributes of the intermediate device and the sink media device.

4. The multimedia device of claim 1, wherein the plurality of devices includes a sink device and an audio video receiver (AVR) that are coupled via the second multimedia cable.

5. The multimedia device of claim 1, wherein the power state determiner is configured to:
identify a presence of a video attribute in the identification data; and
determine that the sink media device is powered on based on the presence of the video attribute.

6. The multimedia device of claim 1, wherein the power state determiner is configured to:
identify an audio attribute in the identification data; and
determine a power state of the intermediate device and of the sink media device based on the identification of the audio attribute.

7. The multimedia device of claim 1, wherein the power state of a first device of the plurality of devices is a powered off state; and
wherein the multimedia device comprises a switching device configured to:
determine that a first communication protocol is inoperable to power on the first device when the first device is in the powered off state; and
utilize a second a communication protocol to power on the first device.

8. A method of determining a state of a media device, the method comprising:
mapping, in a device map of a multimedia device, to each of a plurality of devices coupled to the multimedia device, an identification of an attribute indicated in identification data received from the device, wherein the plurality of devices includes an intermediate device coupled to the multimedia device via a first multimedia cable, and a sink media device coupled to the intermediate device via a second multimedia cable;
receiving, in the multimedia device, identification data from at least one of the plurality of devices coupled to the multimedia device;
identifying attributes in the received identification data;
associating the identified attributes with one or more of the plurality of devices using the device map; and
determining a power state of the plurality of devices based on the association of the identified attributes using the device map, the determined power state for each device indicating whether the device is powered on or powered off.

9. The method of claim 8, wherein the identification data comprises Extended Display Identification Data (EDID).

10. The method of claim 8, wherein the received identification data comprises modified identification information, the modified identification information generated by the intermediate device and including attributes of the intermediate device and the sink media device.

11. The method of claim 8, wherein the plurality of devices includes a sink device and an audio video receiver (AVR) that are coupled via the second multimedia cable.

12. The method of claim 8, wherein said determining the power state comprises:
identifying a presence of a video attribute in the identification data; and
determining that the sink media device is powered on based on the presence of the video attribute.

13. The method of claim 8, wherein said determining the power state comprises:
identifying an audio attribute in the identification data; and
determining a power state of the intermediate device and of the sink media device based on the identification of the audio attribute.

14. The method of claim 8, wherein the power state of a first device of the plurality of devices is a powered off state; and
wherein the method further comprises:
determining that a first communication protocol is inoperable to power on the first device when the first device is in the powered off state; and
utilizing a second a communication protocol to power on the first device.

15. A system comprising:
a storage device containing a device map that maps, to each of a plurality of devices, an identification of an attribute indicated in identification data received from the device, wherein the plurality of devices includes an intermediate device coupled to a multimedia device via a first multimedia cable, and a sink media device coupled to the intermediate device via a second multimedia cable;
a multimedia port configured to receive identification data from at least one of a plurality of devices; and
one or more processing components to automatically determine a power state, the automatic determination of a power state including:
identifying attributes in the received identification data;
associating the identified attributes with one or more of the plurality of devices using the device map; and
determining a power state of the plurality of devices based on the association of the identified attributes using the device map, the determined power state for each device indicating whether the device is powered on or powered off.

16. The system of claim 15, wherein the identification data comprises Extended Display Identification Data (EDID).

17. The system of claim 15, wherein the received identification data comprises modified identification information, the modified identification information generated by the intermediate device and including attributes of the intermediate device and the sink media device.

18. The system of claim 15, wherein the plurality of devices includes a sink device and an audio video receiver (AVR) that are coupled via the second multimedia cable.

19. The system of claim 15, wherein said determining the power state comprises:
identifying a presence of a video attribute in the identification data; and determining that the sink media device is powered on based on the presence of the video attribute.

20. The system of claim 15, wherein said determining the power state comprises:

identifying an audio attribute in the identification data; and determining a power state of the intermediate device and of the sink media device based on the identification of the audio attribute.

* * * * *